US007639793B1

(12) United States Patent
Croak et al.

(10) Patent No.: US 7,639,793 B1
(45) Date of Patent: Dec. 29, 2009

(54) METHOD AND APPARATUS FOR RECONFIGURING NETWORK ROUTES

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 821 days.

(21) Appl. No.: 11/263,293

(22) Filed: Oct. 31, 2005

(51) Int. Cl.
*H04M 7/00* (2006.01)
(52) U.S. Cl. ............. 379/221.01; 379/219; 379/221.03; 379/221.04; 379/221.07
(58) Field of Classification Search ................. 379/219, 379/221.01, 221.03, 221.04, 221.07; 370/217
See application file for complete search history.

(56) References Cited

U.S. PATENT DOCUMENTS

| 6,212,169 | B1* | 4/2001 | Bawa et al. .................. 370/252 |
| 6,510,219 | B1* | 1/2003 | Wellard et al. .......... 379/221.01 |
| 7,428,209 | B1* | 9/2008 | Roberts ....................... 370/217 |
| 2002/0109879 | A1* | 8/2002 | Wing So ...................... 359/118 |
| 2005/0007955 | A1* | 1/2005 | Schrodi ....................... 370/230 |

* cited by examiner

*Primary Examiner*—Thjuan K Addy

(57) ABSTRACT

A method and apparatus for ensuring that every path in an IP network that interconnects a pair of VoIP network elements comprises diverse network routes and is engineered with adequate bandwidth to support VoIP phone calls are disclosed. In the event that a single point of failure or inadequate bandwidth is detected between a pair of VoIP network elements, an alarm is issued and network engineers are notified to reconfigure the routes between the VoIP network element pair.

15 Claims, 4 Drawing Sheets

METHOD AND APPARATUS FOR RECONFIGURING NETWORK ROUTES

The present invention relates generally to communication networks and, more particularly, to a method and apparatus for reconfiguring network routes upon network conditions in communication networks, e.g., packet networks such as Voice over Internet Protocol (VoIP) networks.

BACKGROUND OF THE INVENTION

VoIP networks can only perform as well as the underlying Internet Protocol (IP) networks that the VoIP networks depend on. Failure or defects in the underlying IP networks can affect the call completion rate and the overall voice quality of VoIP calls. In order to increase the overall reliability and availability of the VoIP network, route diversity and bandwidth availability between VoIP network element pairs in the VoIP network must be properly engineered and configured continuously.

Therefore, a need exists for a method and apparatus for reconfiguring network routes upon network conditions in a packet network, e.g., a VoIP network.

SUMMARY OF THE INVENTION

In one embodiment, the present invention ensures that every path in an IP network that interconnects a pair of VoIP network elements comprises diverse network routes and is engineered with adequate bandwidth to support VoIP phone calls. In the event that a single point of failure or inadequate bandwidth is detected between a pair of VoIP network elements, an alarm is issued and network engineers are notified to reconfigure the routes between the VoIP network element pair.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
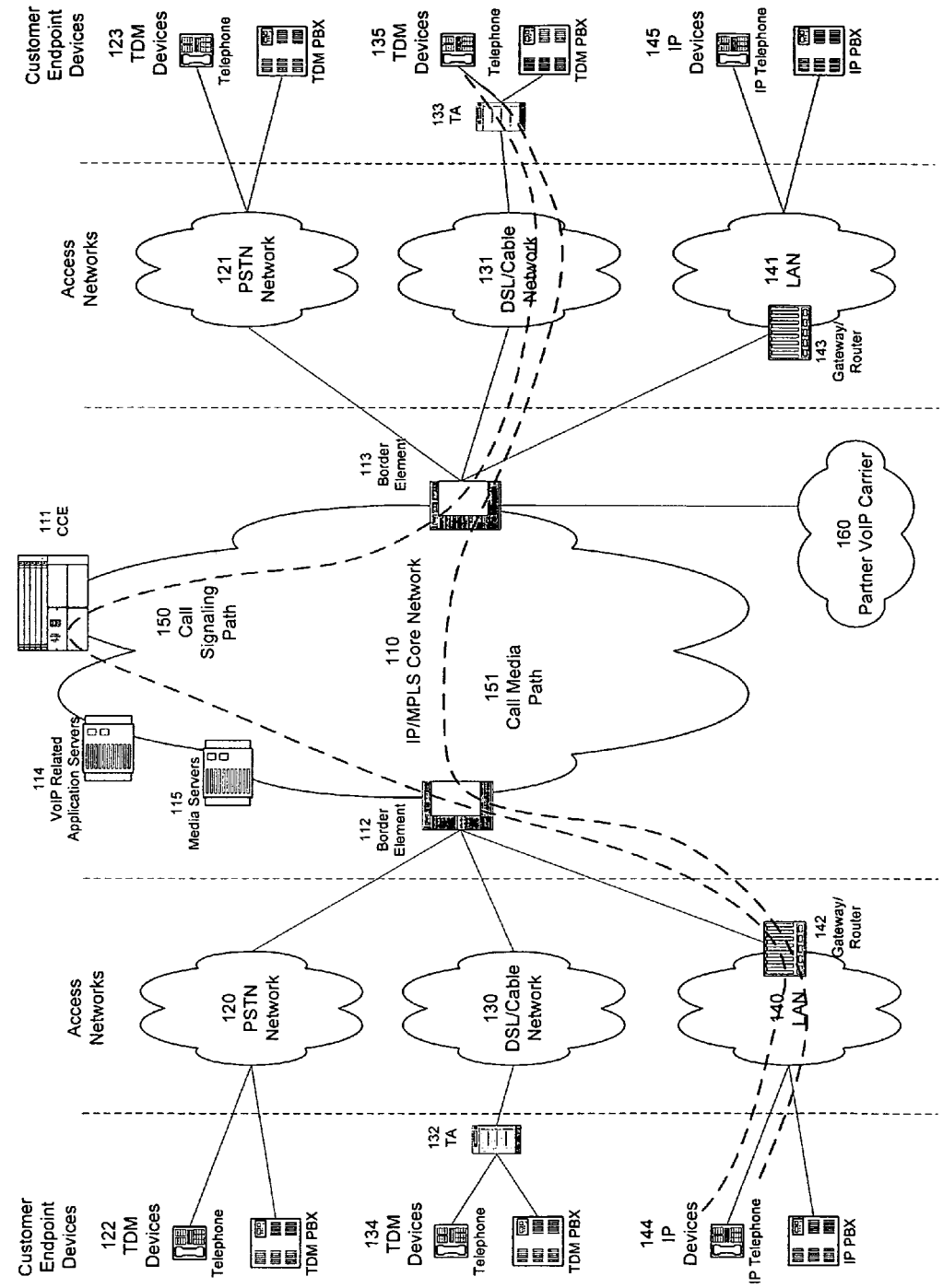
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

VoIP networks can only perform as well as the underlying Internet Protocol (IP) networks that the VoIP networks depend on. Failure or defects in the underlying IP networks can affect the call completion rate and the overall voice quality of VoIP calls. In order to increase the overall reliability and availability of the VoIP network, route diversity and bandwidth availability between VoIP network element pairs in the VoIP network must be properly engineered and configured continuously.

To address this need, the present invention ensures that every path in an IP network that interconnects a pair of VoIP network elements comprises diverse network routes and is engineered with adequate bandwidth to support VoIP phone calls. In the event that a single point of failure or inadequate bandwidth is detected between a pair of VoIP network elements, an alarm is issued and network engineers are notified to reconfigure the routes between the VoIP network element pair.

Figure 2:
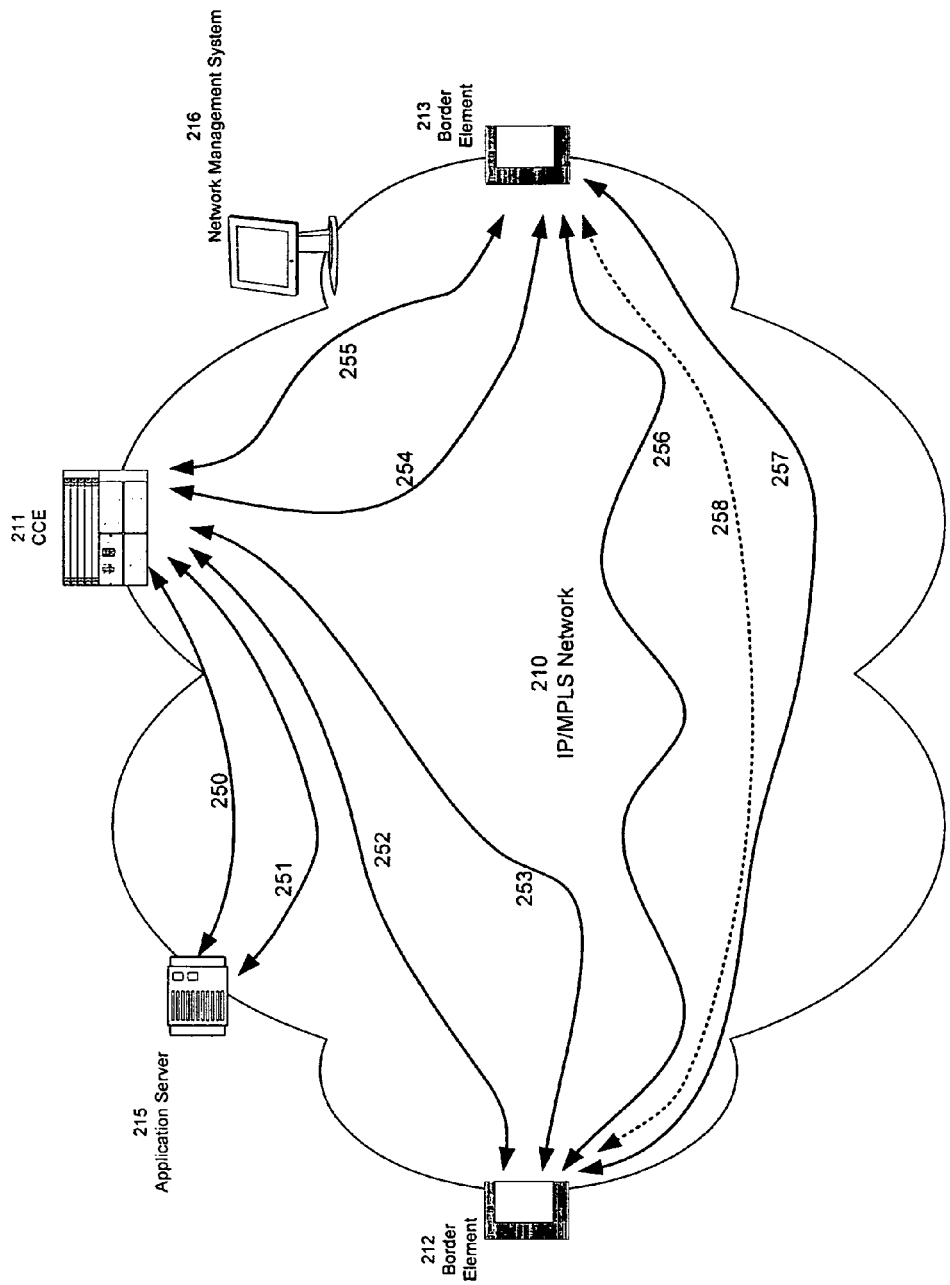
FIG. 2 illustrates an example of reconfiguring network routes upon network conditions in a VoIP network of the present invention.

FIG. 2 illustrates an example 200 of reconfiguring network routes upon network conditions in a packet network, e.g., a VoIP network of the present invention. In FIG. 2, VoIP network elements are interconnected using the underlying IP/MPLS network 210. For instance, CCE 211 is interconnected to AS 215 via route 250 and route 251, CCE 211 is interconnected to BE 212 via route 252 and route 253, CCE 211 is interconnected to BE 213 via route 254 and route 255, and BE 212 is interconnected to BE 213 via route 256 and route 257. This example shows that between each network element pair, there are at least two diverse routes that interconnect the network element pair. Network Management System (NMS) 216 is responsible for provisioning these routes between all the network element pairs.

In addition, NMS 216 is also responsible for monitoring the status of these routes. For instance, NMS 216 monitors the status of each of these routes for route diversity and bandwidth availability. Route diversity is the availability of at least two routes interconnecting a pair of network elements. A route may become unavailable due to failed underlying IP/MPLS network elements or links within IP/MPLS network 210. Bandwidth availability is the availability of bandwidth of a particular route interconnecting a pair of network elements, e.g., a minimum bandwidth level that is specified by a network provider of a communication network to be maintained for each pair of network elements. The bandwidth may be inadequate due to unexpected growth of VoIP traffics or other IP traffics on the route or failed underlying IP/MPLS network elements or links within IP/MPLS network 210.

In one example, when route 256 between BE 212 and BE 213 becomes unavailable, e.g., caused by an underlying IP/MPLS link failure, the route diversity between BE 212 and BE 213 is violated. Upon detecting this route diversity violation, NMS 216 raises an alarm to warn the network operator and then creates an alternative route, e.g., route 258, which will take the place of route 256 to maintain route diversity between BE 212 and BE 213.

In another example, when route 256 between BE 212 and BE 213 becomes low in available bandwidth caused by an unexpected growth of VoIP traffics on route 256, NMS 216 raises an alarm to warn the network operator and then attempts to increase the available bandwidth for route 256. If the attempt to increase the available bandwidth for route 256 fails, then NMS 216 will create an alternative route, route 258, which will take the place of route 256 to maintain adequate bandwidth availability between BE 212 and BE 213. NMS 216 continuously monitors route diversity and bandwidth availability between all applicable VoIP network element pairs. VoIP network elements include, but not limited to, CCE, BE, AS, MS, or any network elements that supports VoIP service related processing.

Figure 3:
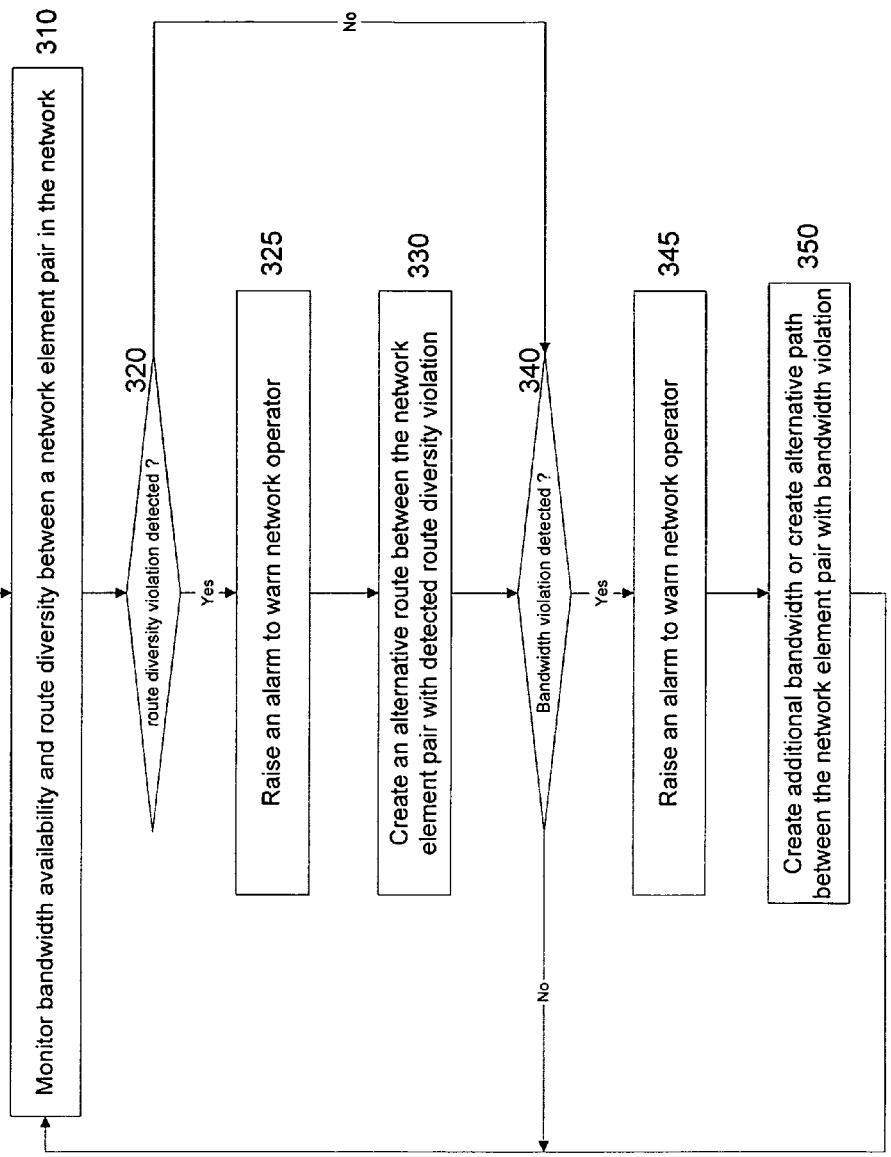
FIG. 3 illustrates a flowchart of a method for reconfiguring network routes upon network conditions in a packet network, e.g., a VoIP network, of the present invention.

FIG. 3 illustrates a flowchart of a method 300 for reconfiguring network routes upon network conditions in a packet network, e.g., a VoIP network, of the present invention. Method 300 is executed continuously be a Network Management System. Method 300 starts in step 305 and proceeds to step 310.

In step 310, the method monitors the route diversity and bandwidth availability between a VoIP network element pair in a VoIP network. For example, the network element pair may comprise a CCE-BE pair, a BE-BE pair, a CCE-AS pair and the like.

In step 320, the method checks if the route diversity between the network element pair is violated. If the route diversity between the network element pair is violated, the method proceeds to step 325; otherwise, the method proceeds to step 340.

In step 325, an alarm is raised to warn the network operator. For example, a notification message can be sent to the network operator.

In step 330, the method creates an alternative route between the network element pair with detected route diversity violation. Note that the network element pair is interconnected by two or more diverse routes to ensure VoIP service reliability and availability.

In step 340, the method checks if the bandwidth availability between the network element pair is violated. If the bandwidth availability between the network element pair is violated, the method proceeds to step 345; otherwise, the method proceeds back to step 310.

In step 345, an alarm is raised to warn the network operator. For example, a notification message can be sent to the network operator.

In step 350, the method creates additional bandwidth in the route interconnecting the network element pair with detected bandwidth availability violation. If the method fails to create the additional required bandwidth to maintain adequate bandwidth availability, the method may create an alternative route between the network element pair to replace the original route with bandwidth availability violation. The method then proceeds back to step 310.

Figure 4:
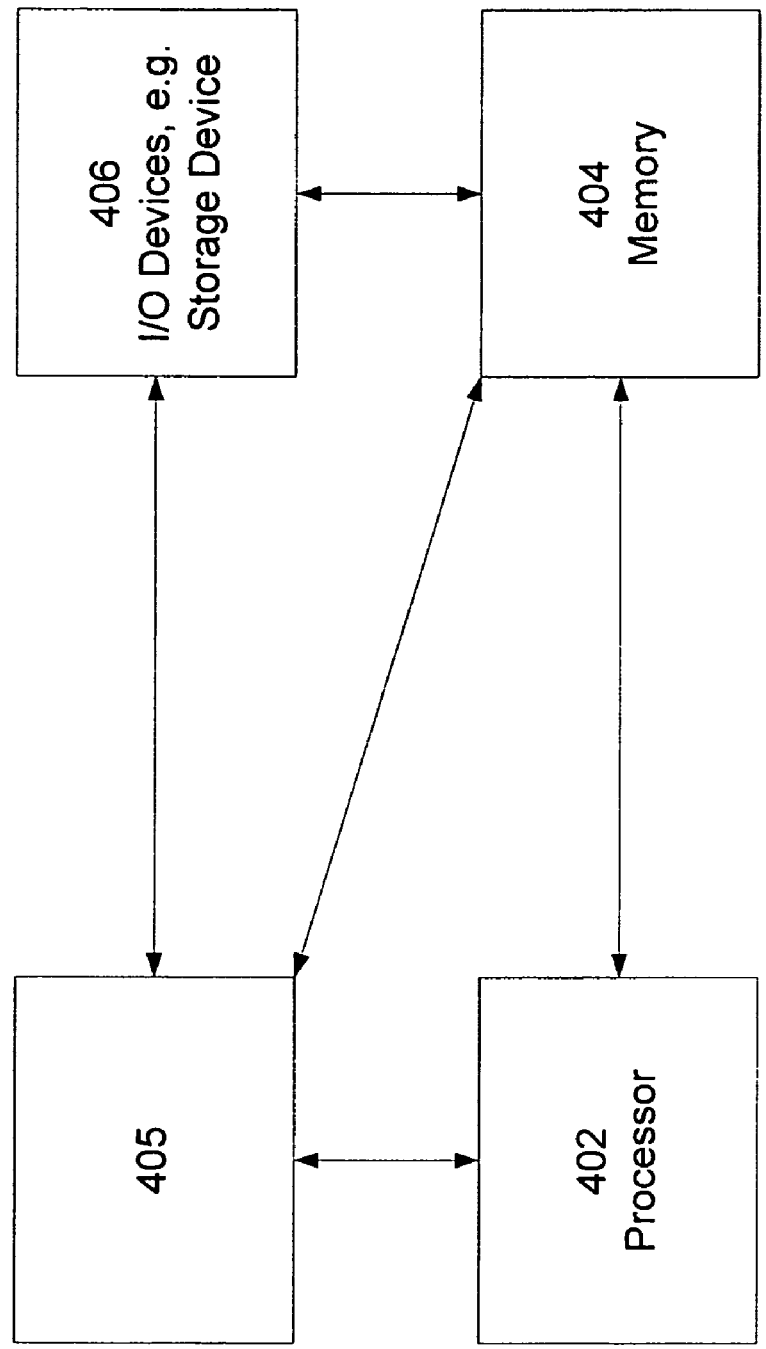
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for reconfiguring network routes upon network conditions, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for reconfiguring network routes upon network conditions can be loaded into memory 404 and executed by processor 402 to implement the functions as discussed above. As such, the present process 405 for reconfiguring network routes upon network conditions (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for reconfiguring network routes in a communication network, comprising:

monitoring a route diversity and a bandwidth availability between at least one network element pair in said communication network, where each of said at least one network element pair comprises a first network element and a second network element, wherein said route diversity comprises an availability of at least two network routes for interconnecting said first network element and said second network element; and reconfiguring a network route between said at least one network element pair if a route diversity violation or a bandwidth availability violation is detected, wherein said reconfiguring said network route if said route diversity violation is detected comprises:

creating an alternative route to replace one of said at least two network routes between said first network element and said second network element of said at least one network element pair.

2. The method of claim 1, wherein said communication network is a Voice over Internet Protocol (VoIP) network or a Service over Internet Protocol (SoIP) network.

3. The method of claim 1, wherein said bandwidth availability comprises a minimum bandwidth level that is specified by a network provider of said communication network to be maintained between said first network element and said second network element.

4. The method of claim 1, wherein said reconfiguring said network route if said bandwidth availability violation is detected comprises:

increasing said bandwidth availability between said first network element and said second network element of said at least one network element pair; or creating an alternative route to replace one of said at least two network routes between said first network element and said second network element of said at least one network element pair.

5. The method of claim 1, wherein said route diversity and said bandwidth availability are monitored by a Network Management System.

6. The method of claim 5, wherein said route reconfiguration is performed by said Network Management System.

7. A computer-readable medium having stored thereon a plurality of instructions, the plurality of instructions including instructions which, when executed by a processor, cause the processor to perform steps of a method for reconfiguring network routes in a communication network, comprising:

monitoring a route diversity and a bandwidth availability between at least one network element pair in said communication network, where each of said at least one network element pair comprises a first network element and a second network element, wherein said route diversity comprises an availability of at least two network routes for interconnecting said first network element and said second network element; and reconfiguring a network route between said at least one network element pair if a route diversity violation or a bandwidth availability violation is detected, wherein said reconfiguring said network route if said route diversity violation is detected comprises:

creating an alternative route to replace one of said at least two network routes between said first network element and said second network element of said at least one network element pair.

8. The computer-readable medium of claim 7, wherein said communication network is a Voice over Internet Protocol (VoIP) network or a Service over Internet Protocol (SoIP) network.

9. The computer-readable medium of claim 7, wherein said bandwidth availability comprises a minimum bandwidth level that is specified by a network provider of said communication network to be maintained between said first network element and said second network element.

10. The computer-readable medium of claim 7, wherein said reconfiguring said network route if said bandwidth availability violation is detected comprises:
increasing said bandwidth availability between said first network element and said second network element of said at least one network element pair; or
creating an alternative route to replace one of said at least two network routes between said first network element and said second network element of said at least one network element pair.

11. The computer-readable medium of claim 7, wherein said route diversity and said bandwidth availability are monitored by a Network Management System.

12. The computer-readable medium of claim 11, wherein said route reconfiguration is performed by said Network Management System.

13. An apparatus for reconfiguring network routes in a communication network, comprising:
means for monitoring a route diversity and a bandwidth availability between at least one network element pair in said communication network, where each of said at least one network element pair comprises a first network element and a second network element, wherein said route diversity comprises an availability of at least two network routes for interconnecting said first network element and said second network element; and
means for reconfiguring a network route between said at least one network element pair if a route diversity violation or a bandwidth availability violation is detected, wherein said means for reconfiguring said network route if said route diversity violation is detected, creates an alternative route to replace one of said at least two network routes between said first network element and said second network element of said at least one network element pair.

14. The apparatus of claim 13, wherein said communication network is a Voice over Internet Protocol (VoIP) network or a Service over Internet Protocol (SoIP) network.

15. The apparatus of claim 13, wherein said bandwidth availability comprises a minimum bandwidth level that is specified by a network provider of said communication network to be maintained between said first network element and said second network element.

* * * * *